United States Patent [19]

Moore

[11] 3,837,831

[45] Sept. 24, 1974

[54] MELTING AND REFINING OF AMBER GLASS

[75] Inventor: Ronald H. Moore, Sylvania, Ohio

[73] Assignee: Owens-Illinois, Inc., Toledo, Ohio

[22] Filed: Mar. 14, 1973

[21] Appl. No.: 341,166

[52] U.S. Cl. .................................. 65/134, 106/52
[51] Int. Cl. ............................................ C03g 5/16
[58] Field of Search ..................... 65/134; 106/52

[56] References Cited
UNITED STATES PATENTS

| | | | |
|---|---|---|---|
| 3,145,115 | 8/1964 | Weidel | 106/52 |
| 3,325,299 | 6/1967 | Araujo | 106/52 |
| 3,511,629 | 5/1970 | Bauer et al. | 65/134 |
| 3,513,003 | 5/1970 | Hammer et al. | 65/134 X |
| 3,627,548 | 12/1971 | Hammer et al. | 65/134 X |

Primary Examiner—S. Leon Bashore
Assistant Examiner—Frank W. Miga
Attorney, Agent, or Firm—Howard G. Bruss, Jr.; E. J. Holler

[57] ABSTRACT

Disclosed is a process for improving the melting and refining characteristics of soda-lime amber glasses containing iron and sulfur as the color-producing ingredients, by substituting copper oxide in the batch in part for the iron or sulfur colorants in a manner to maintain a normal amber color density while decreasing the incidence of gaseous inclusions in the glass.

7 Claims, No Drawings

MELTING AND REFINING OF AMBER GLASS

The present invention relates to a method for melting and refining conventional soda-lime amber glasses. More particularly, the present invention relates to a method for decreasing the incidence of seeds, blisters and other gaseous inclusions in reduced soda-lime amber glasses without substantially darkening the amber coloration thereof.

Soda-lime amber glasses are well-known in the art as exemplified by commonly assigned U.S. Pat. Nos. 3,513,003 (see Columns 5 and 6) and 3,627,548 (see Columns 4 and 5). These amber glasses are sometimes referred to as "reduced" amber glasses because the amber color is due to a chormophore of iron and sulfur formed under the reducing conditions which are maintained in the melting furnace. These reduced amber glasses are suitable for the production of food and beverage containers. These glasses exhibit high absorption for ultraviolet rays and short-wave length visible rays up to about 550 millimicrons and are used in packaging foods and beverages which are adversely effected by such radiation.

The batches for making these amber glasses contain iron, sulfur, and a reducing agent such as sea coal, carbon, carbocite, oil, elemental silicon, or graphite in addition to the usual glassmaking batch components. During melting, the reducing agent reduces the sulfur to the sulfide state. The iron and the sulfide sulfur combine to form a color complex or chromophore in the molten glass to impart the characteristic amber coloration.

These reduced amber glasses are relatively unstable in nature as compared to oxidized colorless glass due to the reduction reaction that is continually occurring therein. Sulfide sulfur forms a somewhat weak chemical bonds with iron and is readily oxidized to elemental sulfur or sulfate which have relatively high vapor pressure and can form gaseous inclusions. As a consequence, amber glasses are difficult to maintain relatively seed-free, and gaseous inclusions in the form of tiny bubbles which are called blisters or seeds are often present in the finished ware. This condition is undesirable and can render the ware unsuitable for commercial applications.

Conventional reduced, soda-lime amber glasses containing sulfide sulfur and iron as the color-producing ingredients require more energy per unit of glass melted than colorless flint glass because the iron is a strong infrared absorber. This increases the energy consumption by restricting the flow of heat into the mass of glass in the furnace. The present invention improves the heat tranfer characteristics of reduced soda-lime amber glass by lowering the iron content without sacrificing amber coloration.

The problem of gaseous inclusions in amber ware is often compounded by the process of forming the molten amber glass into useful articles. This is particularly true in those forming processes where the molten amber glass is sucked or drawn into the mold. One such process is the so-called Owens process described in the "Handbook of Glass Manufacture" by Tooley, Ogden Publishing Company, New York, New York (1953) at page 312 of Section X. Other references to the Owens process are given in U.S. Pat. No. 2,344,464 and in co-pending commonly assigned U.S. application Ser. No. 101,845 filed Dec. 28, 1970 now U.S. Pat. No. 3,732,086. Another such process is utilized in the Westlake paste mold machine described at page 348 of the above Handbook. The disclosures of these references are incorporated by reference.

These processes are particularly troublesome because the suction applied to the molten amber glass to draw it into the mold, promotes the formation and growth of bubbles in the glass.

The present invention overcomes these difficulties and provides for the efficient melting and fining of reduced amber glasses by adding copper oxide to the amber batch in a proportion sufficient for decreasing the incidence of gaseous inclusions in said amber glass, but in a proportion insufficient to form a glass having a spectral transmission at 550 millimicrons per one-eighth inch thickness of less than about 17 percent. Usually the spectral transmission of the resulting glass is maintained in the range of about 17 to about 22 percent per one-eighth inch thickness for commercial desirability.

An additional advantage of the present invention is that the stabilized amber glass can be supplied to the forming process at a higher temperature without substantial generation of bubbles and seeds therein. This facilitates the forming process because the glass is less viscous at higher temperatures.

Furthermore, the use of copper oxide as a melting and refining aid as a partial replacement for iron oxide, has the additional advantage of improving the heat transfer characteristic of the reduced amber glass because the copper oxide is not a strong infrared absorber like iron oxide. Copper oxide itself has a reddish or dark color of its own depending on the oxidation state of the copper. These colors are quite useful in forming reduced soda-lime amber glasses within the foregoing color specifications.

In practicing the present invention, copper oxide (reported as $Cu_2O$) is incorporated into the reduced soda-lime amber glass batch in the proportion to comprise about 0.01 to about 0.1 percent, and preferably about 0.02 to about 0.05 percent, by weight of the resulting amber glass composition. To maintain the amber color within the above described spectral transmission ranges, it is necessary to substitute copper oxide for sulfide sulfur or iron.

It is theorized that copper and iron compete to react with the sulfide sulfur in the amber glass. In that the copper sulfide chromophore will darken the amber color, the concentration of sulfide sulfur, iron oxide or both must be decreased when using copper oxide according to the present invention to prevent substantial darkening of the resulting amber glass.

Accordingly, to form reduced amber glasses having the above described transmission characteristics, the concentration of these colorants in the finished amber glass composition are maintained as follows with specific amounts thereof being tailored to achieve the desired coloration within the ranges set forth above.

| COMPONENT | BROAD % BY WEIGHT | PREFERRED % BY WEIGHT |
| --- | --- | --- |
| Sulfur (as sulfides) | 0.0005 to 0.04 | 0.01 to 0.035 |
| Iron oxide (as $Fe_2O_3$) | 0.05 to 0.3 | 0.2 to 0.3 |
| Copper oxide (as $Cu_2O$) | 0.01 to 0.1 | 0.02 to 0.05 |

As a frame of reference, it is helpful to those skilled in the glassmaking art to consider the copper oxide as being substituted for part of the iron oxide, part of the sulfide sulfur or part of both iron oxide and sulfide sulfur. In that conventional reduced soda-lime amber glasses have a wide range of content of sulfide sulfur and iron oxide, it is not meaningful to numerically specify the proportioned substitution.

In the past, amber glasses have been darkened and black glassware have been formed therefrom by the use of copper oxide as a batch ingredient. This technique is shown in U.S. Pat. Nos. 1,899,230 and 3,627,548. These patents do not suggest how to use copper oxide as a batch ingredient for stabilizing reduced amber glass against the formation of gaseous inclusion while maintaining the conventional amber color thereof.

Typical reduced, soda-lime, amber glasses into which the foregoing ranges of copper oxide, sulfur and iron oxide can be included in practicing the present invention are the following composition range:

| OXIDE | PERCENT BY WEIGHT |
|---|---|
| $SiO_2$ | 60 – 78 |
| $Al_2O_3$ | 0.3 – 18 |
| CaO | 7 – 18 |
| MgO | 0 – 9 |
| $Na_2O$ | 7 – 18 |
| $K_2O$ | 0 – 5 |
| $Li_2O$ | 0 – 3 |
| $R_2O(Na_2O+K_2O+Li_2O)$ | 7 – 24 |
| BaO | 0 – 5 |

The conditions and procedures for making glasses of the above type are known to the art as exemplified by Table XX, B-11, page 345 of "Handbook of Glass Manufacture" by Tooley, Ogden Publishing Company, New York, New York (1953).

The batch materials used in practicing the present invention are conventional materials for amber glass preparation. The use of sea coal as a reducing agent is advantageous because it completely burns off at glass melting and refining temperatures and therefore does not otherwise influence the properties of the amber glass.

Commercially available grades of copper oxide can be used in this invention. No special size range is required for the copper oxide particles although finely divided forms such as –200 mesh are available and easily used.

The principles of the present invention will be illustrated in the following examples wherein all parts are parts by weight, all percentages are weight percentages, and all temperatures are in °F. unless otherwise stated.

EXAMPLE 1

The following batch ingredients are melted at 2750°F. and refined at 2300°F. in a conventional glass furnace to yield a reduced soda-lime amber glass composition in the molten state. After refining, the molten glass is ladle-sampled and determined to have about five seeds per ounce of glass which are visible to the naked eye. This "seed count" is very low for a reduced amber glass.

| BATCH COMPONENT | PARTS BY WEIGHT |
|---|---|
| Sand (white) | 2000 |
| Soda ash | 749 |
| Limestone | 487 |
| Aplite | 162 |
| Blast furnace slag | 222 |
| Salt cake | 8.0 |
| Anhydrous borax | 5.5 |
| Iron scale | 2.08 |
| Sea coal | 1.04 |
| Copper oxide | 0.83 |
| Cullet (of the same composition | 1111 |

The molten glass is then formed into oneway, 12-ounce capacity glass beer bottles by an Owens Bottle Machine as described in the aforementioned Handbook of Glass Manufacture. The pot temperature in the Owens pot is about 2280°F. The bottles are then annealed in an annealing lehr according to conventional procedures.

The resulting glass bottles are amber (rather than black) in color and have the following composition and properties.

| COMPONENT | % BY WEIGHT |
|---|---|
| $SiO_2$ | 70.51 |
| $Al_2O_3$ | 2.11 |
| $TiO_2$ | 0.049 |
| CaO | 11.39 |
| MgO | 0.72 |
| $Na_2O$ | 14.51 |
| $K_2O$ | 0.18 |
| MnO | 0.036 |
| $Cr_2O_3$ | 0.0006 |
| $B_2O_3$ | 0.12 |
| $F_2$ | 0.09 |
| $Fe_2O_3$ | 0.260 |
| $Cu_2O$ | 0.027 |
| $SO_3$ | 0.008 |
| $S^=$ | 0.034 |

| | |
|---|---|
| Log 2 Viscosity (°F.) | 2540 |
| Log 7 Viscosity (°F.) | 1333 |
| Annealing Point (°F.) | 1025 |
| Liquidus | 1890 |
| Thermal Expansion | $93 \times 10^{-7}$/°C. (0–300°C.) |
| Spectral Transmission at 550 millimicrons per 1/8 inch | 18–20% |
| Redness Ratio [Spectral Transmission at 650 m$\mu$ per ⅛ inch / Spectral Transmission at 550 m$\mu$ per ⅛ inch] | –1.9 |

The bottles are inspected for defects in the form of gaseous inclusion in the form of blisters in the bottle finish. This is a common defect in forming reduced amber glass by the Owens process because of the manner in which the gob of glass is sucked or drawn in the mold. Only about 4 percent of the bottles thus formed contained "blister finish" defects so as to render them commercially unacceptable.

As a control on the present invention, the above procedures are repeated except that the copper oxide is deleted from the batch. The refined glass is determined to contain about 15–20 seeds per ounce. About 8 percent of the bottles formed therefrom are found to be commercially unacceptable because of "blister finish" defects. These defects are present even after lowering the Owens pot temperature to about 2200°F. which is conventional for this particular composition and furnace.

EXAMPLE 2

The procedures of Example 1 are repeated except that the batch is proportioned to yield about 0.025 percent by weight of sulfide sulfur in the resulting glass bottles. Similar results are obtained.

EXAMPLE 3

The procedures of Example 1 are repeated except that the batch is proportioned to yield about 0.011 percent by weight of sulfide sulfur in the resulting glass bottles. Similar results are obtained.

Having thus described the invention, what is claimed is:

1. In the process for melting and refining a reduced, soda-lime amber glass containing iron oxide (as $Fe_2O_3$) in the proportion of about 0.05 to about 0.3 percent by weight and sulfur (as sulfides) in the proportion of about 0.005 to 0.04 percent by weight, the improvement comprising adding copper oxide as a batch ingredient to said amber glass in the proportion of about 0.01 to about 0.1 percent by weight (as $Cu_2O$) to decrease the incidence of gaseous inclusions in said amber glass, without forming an amber glass having a spectral transmission per one-eighth inch thickness at 550 millimicrons of less than about 17 percent.

2. The process of claim 1 wherein the spectral transmission per one-eighth inch thickness at 550 millimicrons is in the range of about 17 to about 22 percent.

3. The process of claim 1 further including the steps of sucking a molten gob of the resulting refined amber glass into a mold and forming a glass article therefrom.

4. The process of claim 1 wherein the total copper oxide content (as $Cu_2O$) is in the range of about 0.02 to 0.05 percent by weight of the resulting amber glass.

5. The process of claim 1 wherein said amber glass has a composition with the ranges of:

| COMPONENT | % BY WEIGHT |
| --- | --- |
| $SiO_2$ | 60–78 |
| $Al_2O_3$ | 0.3–18 |
| CaO | 7–18 |
| MgO | 0–9 |
| $Na_2O$ | 7–18 |
| $K_2O$ | 0–5 |
| $Li_2O$ | 0–3 |
| $R_2O(Na_2O, K_2O, Li_2O)$ | 7–24 |
| BaO | 0–5 |
| $Fe_2O_3$ | 0.05–0.3 |
| Sulfides | 0.005–0.04 |

6. The process of claim 1 wherein the total iron oxide content (as $Fe_2O_3$) is in the range of about 0.2 to 0.3 percent by weight of the resulting amber glass.

7. The process of claim 1 wherein the total sulfur content (as sulfides) is in the range of about 0.01 to 0.035 percent by weight of the resulting amber glass.

* * * * *